United States Patent
Blay et al.

(10) Patent No.: US 10,619,953 B2
(45) Date of Patent: Apr. 14, 2020

(54) AUTOMATED CONTROL OF HEAT EXCHANGER OPERATION

(71) Applicant: Baltimore Aircoil Company, Inc., Baltimore, MD (US)

(72) Inventors: Preston Blay, Silver Spring, MD (US); Ravindra Singh, Gaithersburg, MD (US); Frank T. Morrison, Crownsville, MD (US); Andrew Beaver, Colorado Springs, CO (US); David Andrew Aaron, Reisterstown, MD (US)

(73) Assignee: BALTIMORE AIRCOIL COMPANY, INC., Jessup, MD (US)

(*) Notice: Subject to any disclaimer, the term of this patent is extended or adjusted under 35 U.S.C. 154(b) by 77 days.

(21) Appl. No.: 15/814,032

(22) Filed: Nov. 15, 2017

(65) Prior Publication Data
US 2019/0145721 A1    May 16, 2019

(51) Int. Cl.
| | |
|---|---|
| B01F 3/04 | (2006.01) |
| F28C 1/14 | (2006.01) |
| F28D 7/08 | (2006.01) |
| F28F 27/02 | (2006.01) |
| F24F 11/83 | (2018.01) |
| F24F 13/16 | (2006.01) |
| F28D 1/04 | (2006.01) |
| F28F 27/00 | (2006.01) |

(52) U.S. Cl.
CPC ............ *F28F 27/02* (2013.01); *B01F 3/04* (2013.01); *F24F 11/83* (2018.01); *F24F 13/16* (2013.01); *F28C 1/14* (2013.01); *F28D 1/0443* (2013.01); *F28D 7/087* (2013.01); *F28F 27/003* (2013.01); *F25B 2600/25* (2013.01)

(58) Field of Classification Search
CPC ............... B01F 3/04; F28C 1/14; F28D 7/087
USPC ......................................................... 261/128
See application file for complete search history.

(56) References Cited

U.S. PATENT DOCUMENTS

| | | | |
|---|---|---|---|
| 6,213,200 | B1 | 4/2001 | Carter et al. |
| 6,427,461 | B1 | 8/2002 | Whinery et al. |
| 7,310,958 | B2 | 12/2007 | Carter et al. |
| 8,676,385 | B2 | 3/2014 | Myers et al. |

(Continued)

FOREIGN PATENT DOCUMENTS

JP    2007285620 A    11/2007

OTHER PUBLICATIONS

International Search Report and Written Opinion in corresponding International Application No. PCT/US2018/061038, dated Feb. 1, 2019, 15 pages.

*Primary Examiner* — Robert A Hopkins
(74) *Attorney, Agent, or Firm* — Amsted Industries Incorporated

(57) ABSTRACT

An indirect heat exchanger has two airflow paths and an airflow generator to draw air through the airflow paths. A fluid conduit passes through the heat exchanger such that a cooling region is positioned within each of the flow paths. A dispenser is positioned to dispense evaporative liquid on one of the cooling regions. The dispenser operates in a wet mode and a dry mode. A controller regulates airflow through the first flow path and the second flow path, and also controls the operation of the dispenser. In this way, the controller may operate the airflow paths independently such that the airflow through a flow path operating in the dry mode is greater than that of the flow path operating in the wet mode.

24 Claims, 9 Drawing Sheets

(56) References Cited

U.S. PATENT DOCUMENTS

| | | |
|---|---|---|
| 9,279,619 B2 * | 3/2016 | Aaron .................... F28D 7/087 |
| 10,132,577 B2 | 11/2018 | Martell |
| 2004/0196631 A1 | 10/2004 | Ueda et al. |
| 2007/0101746 A1 | 5/2007 | Schlom et al. |
| 2010/0315770 A1 | 12/2010 | Tipley |
| 2011/0100593 A1 | 5/2011 | Benz et al. |
| 2012/0067546 A1 | 3/2012 | Bugler et al. |
| 2018/0224174 A1 | 8/2018 | Hollander et al. |

* cited by examiner

AUTOMATED CONTROL OF HEAT EXCHANGER OPERATION

TECHNICAL FIELD

This application relates to heat exchangers. More specifically, this application relates to hybrid heat exchangers that operate with at least two different airflow paths independent of one another.

BACKGROUND

Some heat exchangers operate by transmitting fluid through a conduit and passing cool air over that conduit. For example, a heat exchanger may include a pipe that enters into a flow path, and then forms a coil before exiting out of the flow path. The heat exchanger may also be a plate type or any other type of indirect heat exchanger. Air, typically cool air relative to the indirect heat exchanger, passes over the coil, which uses convection principals to facilitate the indirect exchange of heat between the fluid and the air.

To increase the efficiency of this process, some heat exchangers use a "wet" process that dispense evaporative liquid, such as water, over the coils. This invokes the principals of evaporation to further increase the rate of heat transfer from the fluid. For instance, an evaporative indirect heat exchange process can operate about five times more efficiently than a dry heat exchange process. However, in some situations it may be desirable to conserve use of evaporative liquid, and thus restrict, limit, or control use of a heat exchanger in wet process. In such situations, it may make sense to operate the heat exchanger intermittently in wet and dry modes.

SUMMARY

This application describes examples of heat exchangers. One example describes an indirect heat exchanger with two airflow paths that draw air between an air intake and an air discharge outlet. A fluid conduit passes through the heat exchanger, and the conduit has a cooling region positioned within each of the flow paths. The indirect heat exchanger includes an airflow generator that moves air through the airflow paths. The heat exchanger also includes a dispenser positioned to dispense evaporative liquid on the cooling regions. The dispenser operates in a wet mode whereby the dispenser dispenses the evaporative liquid (i.e. the dispenser is "on") and a dry mode whereby the dispenser does not dispense evaporative liquid (i.e., the dispenser is "off"). Evaporative liquid as used throughout this application can be any liquid designed to evaporate within the operating parameters of the heat exchanger so as to increase the heat exchanger efficiency. An example of evaporative liquid is water, though other liquids may be used. References herein to the use of water as an evaporative liquid are exemplary and it should be understood that other evaporative liquids could be substituted for water where such a reference is made.

A controller communicates with the airflow generator and controls or regulates airflow through the first airflow path and the second airflow path. The controller also communicates with the dispenser(s) and controls the operation thereof. In this way, the controller may operate the airflow paths independently of one another such that the airflow through a flow path operating in the dry mode may be greater than that of an airflow path operating in the wet mode when desired to save water.

This application also describes examples of heat exchanger assemblies similar to those described above, but where one of the flow paths operates as an indirect heat exchanger and the other operates as a direct heat exchanger. The indirect heat exchanger operates using principals of convection and is consistent with the example described above. That is, the conduit may include a cooling section placed in an airflow path, whereby the coiled section may be exposed to evaporative fluid from a dispenser. In the direct heat exchange section the cooling section is typically made of a fill section over which an evaporative liquid such as water is transferred. In such a heat exchanger assembly, the controller can be used to control the flow of air over the direct and indirect heat exchange sections independently, and also to control whether the evaporative liquid is dispensed in each section.

This application also describes examples of methods for operating a heat exchanger, including, for example, the heat exchangers described above. One method involving operation of an indirect heat exchanger involves passing fluid through at least two conduits. Each conduit has a cooling region positioned within a different airflow path of the indirect heat exchanger. The method further involves monitoring process parameters (e.g., user set points, performance factors, water/energy usage/cost factors, and external conditions such as environmental temperature and humidity) with a controller, and then determining suitable airflow rates and dispensing rates based on those process parameters. Once suitable airflow and dispensing rates are determined, the method can then set the heat exchanger to operate (e.g., using the controller) at the determined airflow and dispensing rates, for example, by adjusting the settings of air generation devices and dispensing devices. In this way, the method can operate the heat exchanger so that both of the flow paths operate in a wet mode, both of the flow paths operate in a dry mode or one of the flow paths operates in a wet mode while the other simultaneously operates in the dry mode.

This application also describes examples of heat exchanger networks. In one such example, a heat exchanger network includes multiple indirect heat exchangers. The heat exchangers can be the heat exchangers described above or another type. At the least, the heat exchangers in the network each have at least one airflow path between a heat exchanger intake and a heat exchanger discharge outlet and an airflow generator configured to move air through the airflow path. The heat exchangers also have a fluid conduit including a cooling region positioned within the airflow path, and a dispenser positioned to dispense evaporative fluid on the cooling region. The network includes a controller that communicates with each of the heat exchangers to regulate airflow through the airflow paths and operation of each of the dispensers. The controller also monitors process parameters, and determines a suitable airflow rate and a suitable evaporative liquid dispensing mode for each of the heat exchangers based (at least in part) on those monitored process parameters. The controller can thus set the airflow rates through individual heat exchangers to the corresponding determined suitable airflow rate for that indirect heat exchanger. The controller can also set the dispensing mode of the dispensers to the determined suitable evaporative liquid dispensing mode for that indirect heat exchanger. In this way, the controller can operate one or more of the dispensers in a wet mode while simultaneously operating at least one of the individual dispensers in a dry mode.

In the examples provided, each heat exchanger may share their air inlets and may have different air outlets, each heat exchanger may have different air inlets but share their air outlets, each heat exchanger may share both their air inlets and their air outlets or each heat exchanger may have separate air inlets and separate air outlets however, the logic controller has the ability to independently control the amount of airflow through each heat exchanger and independently control whether each heat exchanger operates in a wet or dry operating mode.

DETAILED DESCRIPTION

This application describes heat exchangers that have multiple airflow paths, whereby the airflow paths are capable of operating independently. That is, the airflow paths of one heat exchanger can operate in a wet mode with an airflow rate at a first airflow level, while the other airflow path operates in a dry mode at a second airflow level different from that of the first. The airflow rates and operating modes are determined by a controller that monitors process parameters that have an impact on the way the heat exchanger operates. Based on those process parameters, the controller determines a suitable operating condition (including a wet/dry operating mode and an airflow rate) for each of the airflow paths, and sets the heat exchanger to operate according to those conditions.

Operating a heat exchanger in dual modes can be an effective way to control or limit the use of water in a heat exchanger. For example, U.S. Pat. No. 8,676,385 relates to a heat exchanger unit with two indirect coil sections. The heat exchanger is capable of operating in a wet mode on one side while in a dry mode on the other side. However, this heat exchanger has only one fan, and provides no way to separately control airflow through wet and dry coil sections.

Thus, when this heat exchanger operates in a hybrid mode (one side in the wet mode and the other dry), the wet side will dominate the heat transfer or unit capacity because of the more efficient heat transfer properties of the wet/evaporative process. Because the wet side dominates in the heat transfer, the dry side is effectively rendered moot, thereby resulting in a process that wastes evaporative liquid (e.g., water). Even when the dry side indirect heat exchanger is finned with extended heat transfer surface as known in the art, the operating water side will still dominate the heat transfer such that the dry side is effectively rendered moot, thereby resulting in a process that wastes evaporative liquid (e.g., water).

This application describes examples of heat exchangers that are capable of operating a "wet" side or airflow path and a "dry" side or airflow path independently of one another so as to optimize efficiency of the heat exchanger based on monitored parameters. For example, the application describes multi-airflow-path heat exchangers that can operate a wet path at a first airflow rate and a dry path at a second flow rate, such that the usage of evaporative fluid can be reduced, limited, and/or optimized, while still allowing the dry path to provide a relatively effective impact on the heat exchange process relative to when the same airflow rate is seen by the wet and dry paths.

Figure 1:
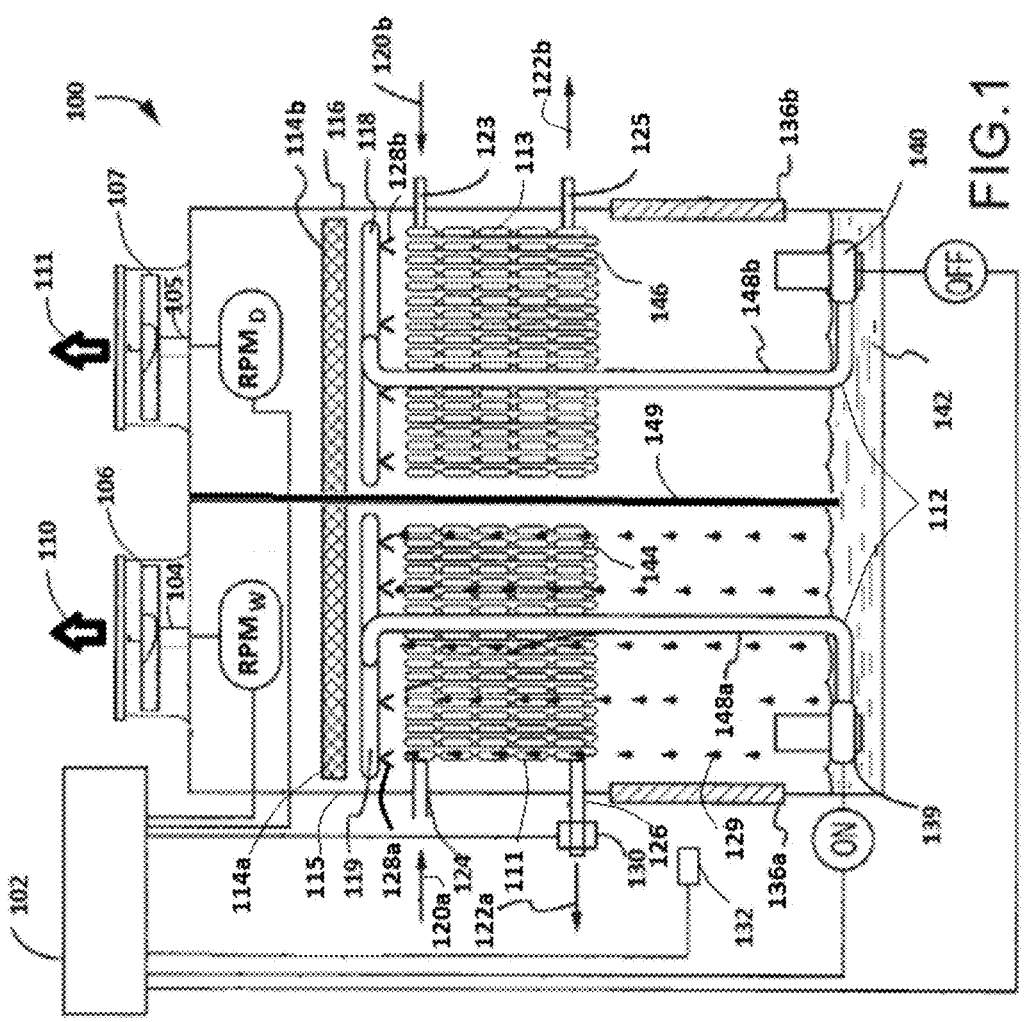
FIG. 1 shows a multi-airflow-path indirect heat exchanger with a multiple airflow generators operating in a hybrid mode in accordance with examples described in this application.

FIG. 1 shows embodiment 100 which is a single unit with multiple airflow paths that includes a first airflow path 115 and a second airflow path 116. Airflow paths 115 and 116 are separated by divider wall 149, which serves to separate the spray of evaporative liquid and airflow through each path.

First airflow path 115 includes airflow generator or fan 106, which has a motor 104 that drives the fan 106 and the second path 116 has a corresponding airflow generator 107 and motor 105. Airflow generators 106/107 are shown in FIG. 1 as fans, but other examples may utilize any device capable of moving air, such as a blower, an air pressure device, and/or combinations or multiples thereof. Fans 106 and 107 discharge the exit air 110 and 111 respectively from indirect heat exchanger airflow paths 115 and 116 respectively. Although FIG. 1 is shown with a single fan for airflow path 115 and a single fan for airflow path 116, there could be multiple fans dedicated to airflow path 115 and multiple fans dedicated to airflow path 116. Ambient air enters inlet louvers 136a and 136b and travels generally upward through each airflow path 115/116 then through mist eliminators 114a and 114b and is thereby propelled out of indirect heat exchanger 100 through fans 106 and 107. While the airflow direction is shown in the example as generally upward, the airflow may be in parallel or also in crossflow with the evaporative liquid and is not a limitation.

Each airflow path also includes respective conduits that draw fluid into the path to be cooled. For example, airflow path 115 has a conduit 111 with conduit inlet 124 that receives hot fluid 120a that is to be cooled or condensed, and conduit outlet 126 that returns cooled or condensed fluid 122a. Similarly, the second airflow path 116 has a conduit 113 with a fluid inlet 123 that receives a stream of hot fluid 120b, and outlet 125 that returns a stream of cool or condensed fluid 122b. The respective conduit also include a cooling region 144/146, which can be an indirect coil configuration, plate configuration, or any other configuration. Inlet and outlet connections may be reversed if desired. In some examples, the cooling regions 144/146 are referred to as simply indirect heat exchangers themselves, as this is the location where heat is exchanged from the streams 120a/120b of hot fluid.

The heat exchanger 100 also includes a dispenser 112, which includes separate dispensing units 118 and 119 configured to dispense evaporative fluid in each airflow path 115 and 116, respectively. A common sump 142 includes a reservoir of evaporative liquid and is in communication with each of the dispensing units 118 and 119 associated with each of the heat exchanger airflow paths 115 and 116. The evaporative liquid is a liquid that can be sprayed on the cooling regions of the heat exchanger to facilitate the heat transfer process. In many examples, the evaporative liquid is water, though other liquids can be used. Pumps 139 and 140 pump the evaporative liquid from the common sump 142 into spray discharge pipes 148a and 148b, respectively. The dispensing units 118 and 119 then draw the evaporative liquid up toward nozzles 128a/128b or orifices that emit the evaporative liquid into spray droplets 129. The dispensing units 118 and 119 are positioned to dispense evaporative liquid over the cooling regions 144 and 146 of the respective heat exchanger airflow paths 115 and 116. The dispensing units 118/119 can be adjustable, such that they are capable of operating in a full discharge mode (on), a no discharge mode (off), or various stages in between, where evaporative liquid is discharged at a controlled or reduced flow rate.

The heat exchanger 100 includes a logic controller 102 that has the capability to independently control the speed of the fan motors 104 and 105 that drive fans 106 and 107 respectively and also independently control the operation of pumps 139 and 140. The controller 102 may include one or more processing devices, and may be connected to the heat exchanger directly, for instance, by wire, or indirectly by a wireless connection. The controller 102 is capable of monitoring process parameters. For example, the controller 102 may employ a sensor 132 to monitor ambient temperature, humidity levels, and air pressure levels. The controller 102 can also be configured to receive user inputs 130, for example, pertaining to desired operating conditions, desired final temperatures (e.g., predetermined user set point), desired water and/or energy usage levels, energy and water costs, or other predetermined conditions. The controller 102 may obtain the process parameters through the sensors 130 and 132 as described above, or it may receive the parameters remotely via a communication module or other input mechanism.

Based on these process parameters and the monitored environmental conditions, the controller 102 can determine suitable operating conditions of the heat exchanger. For instance, based on the environmental conditions (e.g., ambient temperature, pressure, and humidity), the desired user set point, and user requested restrictions to minimize water and energy usage, the controller 102 can determine proper dispensing conditions, dispensing rates, and airflow rates for each of the airflow paths 115/116 of the heat exchanger. In one example, the controller 102 may determine a suitable airflow rate for each airflow path, and a suitable dispensing condition (e.g., wet, dry, and/or dispensing rates), and adjust the heat exchanger devices to operate accordingly. For instance, the controller 102 may control whether the dispenser 112 is operating (e.g., by controlling whether pumps 139 and 140 are on or off), and adjust the speeds of fans 106 and 107 to obtain the desired airflow rates through each airflow path 115/116.

Indirect heat exchanger airflow paths 115 and 116 can operate in the wet mode as evaporative or in the dry mode as sensible heat exchangers depending on whether spray pump 139 and 140 are turned on or off. In FIG. 1, indirect heat exchanger airflow path 115 is shown operating in the wet mode as spray pump 139 is turned on and fan motor 104 is also turned on and is operating at speed $RPM_W$ while indirect heat exchanger airflow path 116 is operating in the dry sensible mode because spray pump 140 is turned off yet fan motor 105 is spinning at a different speed $RPM_D$.

The heat exchanger 100 has a variety of different operating conditions. In a first condition, both airflow paths 115/116 are operating in a wet mode, whereby both dispensers 118/119 are dispensing evaporative liquid 129. In a second condition, the heat exchanger 100 can operate in a hybrid mode, where one path is operating in a wet mode (e.g., the corresponding pump is on so that the dispenser dispenses evaporative liquid), and the other path is operating in a dry mode where the dispenser is not dispensing evaporative liquid (e.g., the pump is set to "off"). In a third operating condition, both airflow paths 115/116 can operate in a dry mode, such that neither dispenser unit 118/119 is dispensing evaporative liquid. In another example, the controller 102 can be set to control pumps 139 and 140 to run at nearly equal time periods such that the equipment runs wet and dry for nearly equal time periods.

When an end user customer desires to conserve evaporative liquid but controller 102 determines that at least one indirect heat exchanger airflow path must operate wet, controller 102 can ramp the speed ($RPM_W$) very slow or even off while ramping up the speed of motor 105 ($RPM_D$) thus achieving much more sensible dry heat exchange from indirect heat exchanger airflow path 116 relative to wet heat exchanger path 115. Controller 102 has the capability to balance the amount of water and energy used and ultimately can be set to save operating costs.

Figure 2:
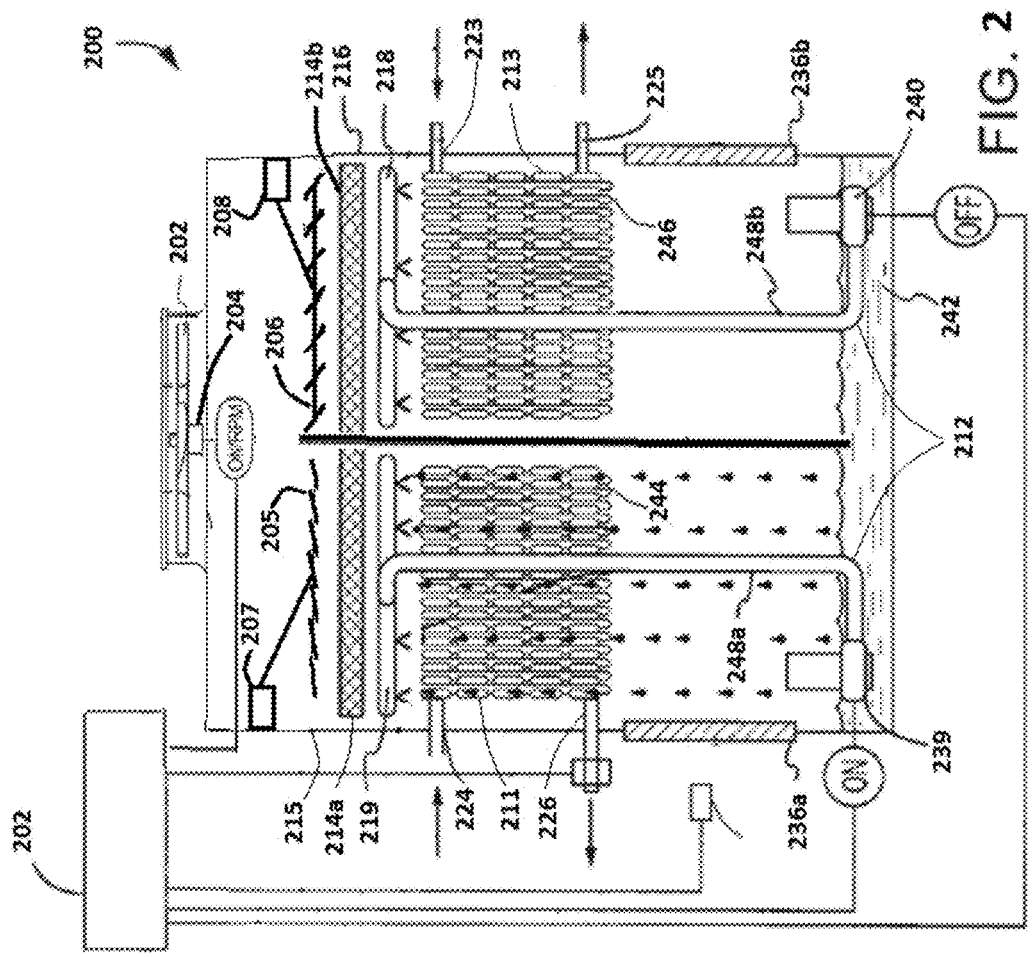
FIG. 2 shows a multi-airflow-path indirect heat exchanger using separate airflow regulators at each heat exchanger discharge to regulate airflow in accordance with examples described in this application.

FIG. 2 shows embodiment 200, which is a single unit with multiple airflow paths that includes a first airflow path 215 and a second airflow path 216. Embodiment 200 employs a single fan 202 which is shared by separate airflow paths 215 and 216, respectively. The heat exchanger 200 of FIG. 2 is similar to that of FIG. 1, but with a few differences. Notably, heat exchanger 200 includes a single fan 202, with a single fan motor. However, although FIG. 2 is shown with a single fan, there could be multiple fans which are shared by the flow paths 215/216. In order to independently control the airflow through the respective flow paths in the heat exchanger 200, the heat exchanger 200 incorporates modulating air discharge dampers 205 and 206, which are controlled by modulating motors 207 and 208.

In FIG. 2, the logic controller 202 has the capability to independently control the proportional position from 0% to 100% open of discharge dampers 205 and 206 and also has the capability to control whether pumps 239 and 240 are on or off depending on parameters such as customer set point, operating mode chosen by the customer, heat exchanger performance, evaporative liquid (or water) and energy costs and environmental conditions external to the heat exchanger such as feedback of temperature or pressure inputs and ambient sensors.

Airflow paths 215 and 216 can operate in the wet mode as evaporative or in the dry mode as sensible heat exchangers depending on whether spray pump 239 and 240 are turned on or off. In FIG. 2, the first airflow path 215 is shown operating in the wet mode as spray pump 239 is turned on and the second flow path 216 is shown operating in the dry mode as spray pump 240 is turned off. In this way, the dispenser 212 can operate in (1) a fully evaporative mode in which both pumps 239 and 242 are on, (2) in a fully dry mode (or a sensible mode) in which both pumps are off, or (3) in a hybrid mode in which one pump is on and the other is off.

Controller 202 controls pumps 239 and 240 to run at nearly equal time periods and discharge dampers 205 and 206 to run at nearly equal time periods such that the equipment runs wet and dry for nearly equal time periods. When an operator intends to conserve evaporative liquid but controller 202 determines that at least one indirect heat exchanger must operate wet, controller 202 uses the logic to turn on pump 239 and turn off pump 240 and in the example shown in FIG. 2 controls discharge damper 205 to be nearly closed while controlling discharge dampers 206 to be nearly open thus allowing much more airflow through dry operating indirect heat exchanger 246 thus achieving much more sensible dry heat exchange from the cooling region 246 relative to having nearly equal airflow rates through each heat exchanger airflow path.

Separate control of airflow through each indirect heat exchanger airflow path inhibits the wet indirect heat exchanger from dominating the heat transfer process (thereby rendering the dry operating heat exchanger moot), and also conserves evaporative liquid. Ambient air enters inlet louvers 236a and 236b and travels generally upward through indirect heat exchangers 244 and 246 then through mist eliminators 214a and 214b and is propelled out of indirect heat exchanger 200 through fan 202. While the airflow direction is shown in the example as generally upward, the airflow may be in parallel or also in crossflow with the evaporative liquid and is not a limitation. Controller 202 also controls the speed of motor 204 which drives fan 202 as required to meet customer set point. Conduits 211 and 213 each have respective cooling regions 244 and 246, respective inlet connections 224 and 223, which receive hot fluid and respective outlet connections 226 and 225 which return cooled or condensed fluid. Inlet and outlet connections may be reversed if desired. Pumps 239 and 240 pump evaporative liquid from a common sump 242 into discharge pipes 248a and 248b and into distribution systems 218 and 219, and ultimately finally out of nozzles or orifices that emit the evaporative liquid.

Figure 3:
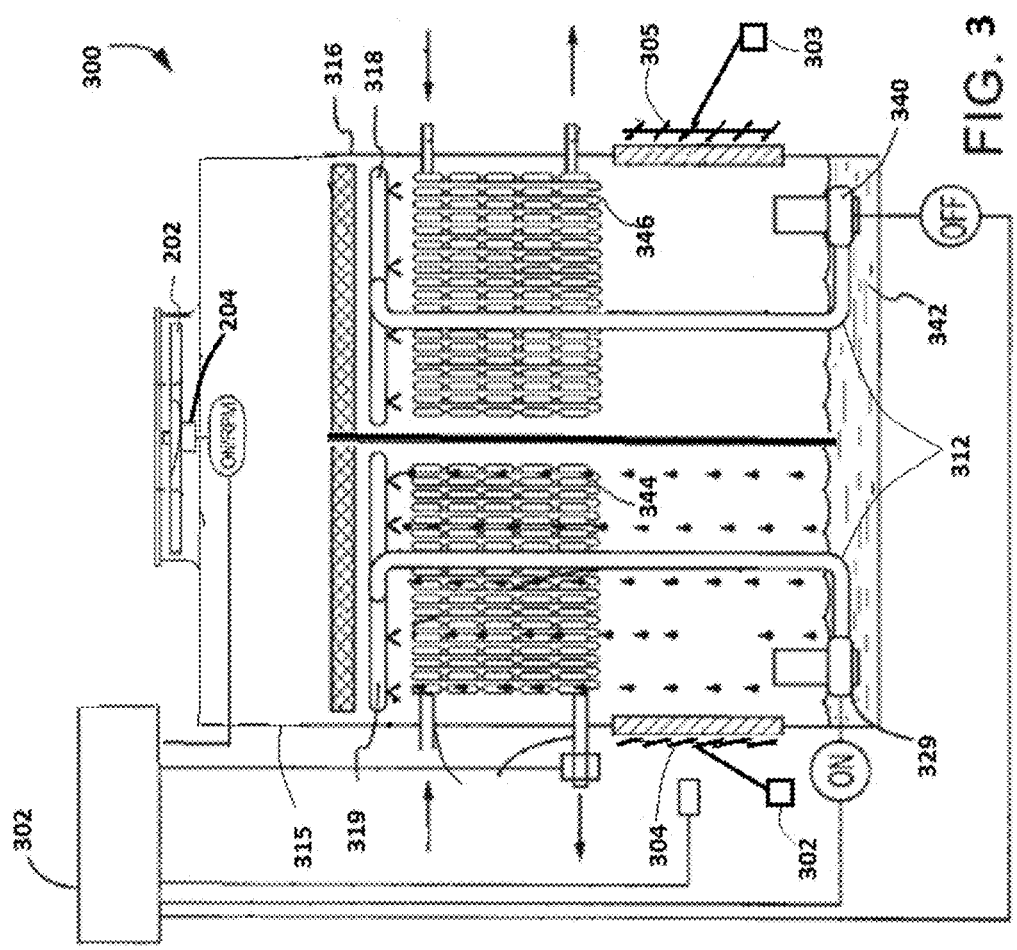
FIG. 3 shows a multi-airflow path indirect heat exchanger using separate airflow regulators at each heat exchanger intake to regulate airflow in accordance with examples described in this application.

FIG. 3 shows another heat exchanger 300, which is a single unit with that includes a first airflow path 315 and a second airflow path 316. Heat exchanger 300 employs a single unit with fan 202 which is shared by airflow paths 315 and 316 respectively. Although FIG. 3 is shown with a single fan, there could be multiple fans which are shared by the flow paths 315/316. Heat exchanger 300 is similar to heat exchanger 200 of FIG. 2, with the exception that heat exchanger 300 controls the airflow through the flow paths 315 and 316 by utilizing modulating air inlet dampers 304 and 305 controlled by modulating motors 302 and 303.

Like with the logic controller of FIG. 2, logic controller 302 has the capability to independently control the proportional position from 0% to 100% open of air inlet dampers 304 and 305 and also has the capability to control whether the dispenser 312 is operating, and which side of the dispenser (i.e., which flow path) is dispensing evaporative liquid.

In FIG. 3, the airflow path 315 is shown operating in the wet mode as the associated dispenser 319 is shown to be "on" as pump 329 is "on" and dispensing droplets of evaporative liquid, and airflow path 316 is shown to be operating in the dry mode as the associated dispenser unit 318 is off as is pump 340 off and not dispensing evaporative liquid.

When an operator intends to conserve evaporative liquid, but controller 302 determines that at least one indirect heat exchanger must operate in a wet mode in order to meet necessary cooling constraints, the controller 302 uses logic to turn on pump 329 and turn off pump 340 and in the example shown in FIG. 3 controls air inlet damper 304 to be nearly closed while controlling air inlet dampers 305 to be nearly open thus allowing much more airflow through dry operating airflow path 316. This helps to achieve a more sensible dry heat exchange from the dry cooling region 346 relative to the wet cooling region 344. Separate control of airflow through each airflow path 315/316 inhibits the wet indirect heat exchanger from dominating the heat transfer process, thereby allowing the heat exchanger 300 to conserve evaporative liquid.

Figure 4:
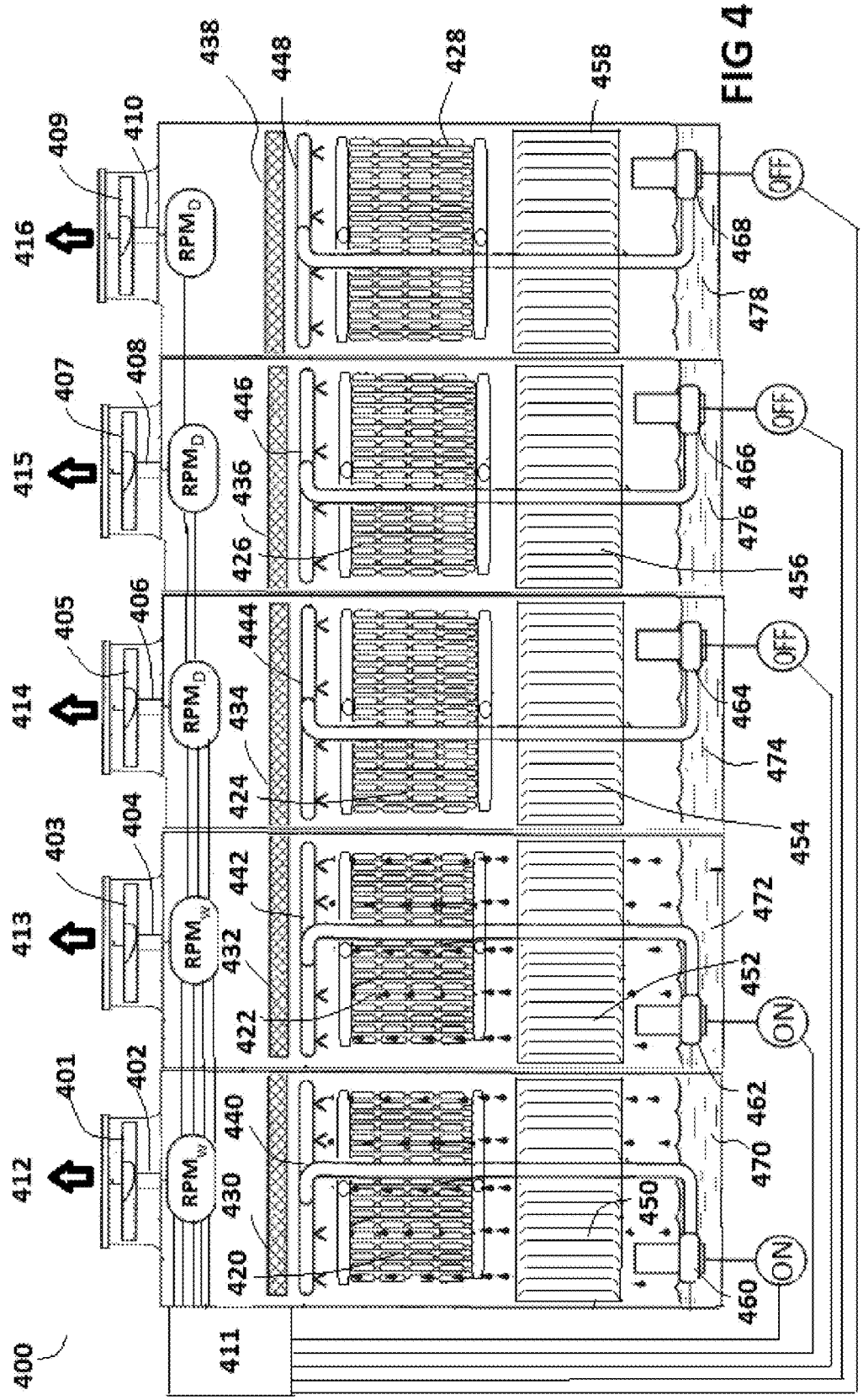
FIG. 4 shows a multi-unit heat exchanger network with some heat exchangers operating in a wet mode and others operating in a dry mode in accordance with examples described in this application.

FIG. 4 shows a heat exchanger network 400 with five modular units bundled together. While this embodiment shows five modular units, it should be appreciated that heat exchanger networks consistent with this disclosure can have any number of units, provided that there are more than one. For instance, a network of two units will work consistent with this embodiment, and in such an example, the units may not need to be placed directly next to each other as long as they are each in communication with a common logic controller 411.

As shown in FIG. 4, each individual unit of the network 400 operates as an independent heat exchanger having its own operating equipment. For instance, each unit has its own indirect heat exchanger or cooling region, labeled from left to right as 420, 422, 424, 426 and 428, respectively. Each unit has its own pump 460, 462, 464, 466, and 468. Each unit has a fan labeled from left to right as 401, 403, 405, 407 and 409 driven by its own motor 402, 404, 406, 408 and 410 respectively. Each unit has its own air inlet louvers starting from left to right 450, 452, 454, 456 and 458 respectively. Each unit has a dispenser, labeled from left to right as 440, 442, 444, 446 and 448. Each unit has an air exhaust, labeled from left to right 412, 413, 414, 415 and 416. Each unit has a sump labeled from left to right as 470, 472, 474, 476, and 478. Finally, each unit has its drift eliminator starting from left to right 430, 432, 434, 436 and 438 respectively.

In FIG. 4, logic controller 411 has the capability to independently control the speed of fan motors (402, 404, 406, 408 and 410) which spins fans (401, 403, 405, 407 and 409), and also has the capability to control whether pumps (460, 462, 464, 466, and 468) are on or off depending on the processing parameters monitored and/or determined by the controller 411.

Fans (401, 403, 405, 407 and 409) discharge the exit air (412, 413, 414, 415 and 416). Individual indirect heat exchangers (420, 422, 424, 426 and 428) can operate in the wet mode as evaporative or in the dry mode as sensible heat exchangers depending on whether the pumps (460, 462, 464, 466 and 468) are turned on or off by controller 411.

In FIG. 4 indirect heat exchangers 420 and 422 are shown operating in the wet mode as only pumps 460 and 462 are turned on. Fan motors 402 and 404 are also turned on and are operating at speed $RPM_W$ while indirect heat exchangers 424, 426 and 428 are operating in the dry sensible mode because spray pumps 464, 466 and 468 are turned off while fan motors 406, 408 and 410 are spinning at $RPM_D$.

In accordance with this configuration, the network 400 can operate in a variety of different arrangements. For example, in one arrangement, all the pumps can be on, thereby operating in a fully evaporative mode. In another arrangement, all the pumps can be off thereby operating in a fully dry (or evaporative liquid conserving) mode. In another arrangement, at least one pump is on and at least one pump is off, thereby operating the network 400 in a hybrid mode.

In one example, controller 411 can be arranged to control pumps 460, 462, 464, 466 and 468 to run at nearly equal time periods such that each modular unit runs wet and dry for nearly equal time periods which can keep the evaporation rates essentially the same for all indirect heat exchangers. In the example shown in FIG. 4, the network is arranged to operate in a hybrid mode that conserves evaporative liquid, because the logic controller 411 has determined that operating all the units in the dry mode is not sufficient to meet the heat exchanging demands. Thus to operate wet yet conserve evaporative liquid, controller 411 is arranged to reduce the amount of heat transfer from the two wet operating units by reducing airflow rate through the respective heat exchangers 420 and 422 by ramping down the speed ($RPM_W$) of motors 402 and 404 while increasing the airflow through the dry operating units 424, 426 and 428 by ramping up the speed of motors 406, 408 and 410 ($RPM_D$). This control can achieve a more sensible dry heat exchange from indirect heat exchangers 424, 426 and 428 relative to wet operating indirect heat exchangers 420 and 422 with nearly equal airflow rates. In the evaporative mode of operation, controller 411 can start the network from a single module running then add additional modules as needed as opposed to turning on all the modules in the network at once. Once all the modules are operating, controller 411 can synchronize the fan speed to maximize energy savings. With this control logic, energy savings can be maximized at every single stage of the operating condition (for example during partial heat loads or lower ambient temperatures) which also saves pump energy consumed by running fewer modules. If the product is oversized by a customer or during partial heat load periods, this logic would provide big energy. During peak loads, the controller 411, can save energy by running all modules at synchronized fan speeds. In the heat exchanger 400 controller 411 may be configured to set the airflow rate through all the airflow paths having a dispenser operating in a wet mode the same (i.e. $RPM_W$) and configured to set the airflow rate through all the airflow paths having a dispenser operating in a dry mode the same (i.e. $RPM_D$).

Ambient air enters inlet louvers 450, 452, 454, 456 and 458 and travels generally upward through indirect heat exchangers 420, 422, 424, 426 and 428 then through drift eliminators 430, 432, 434, 436 and 438 and is propelled out of each modular unit through fans 410, 402, 403, 404 and 405 respectively. Pumps 460, 462, 464, 466, and 468 when turned on, pump evaporative liquid from sumps 470, 472, 474, 476 and 478 into dispenser systems 440, 442, 444, 446 and 448 and finally out of nozzles or orifices that emit the evaporative liquid into spray droplets. When desired, such as during extreme weather conditions, controller 411 may choose to turn off the fan motors and spray pumps on entire modular units as determined by the control logic.

Figure 5:
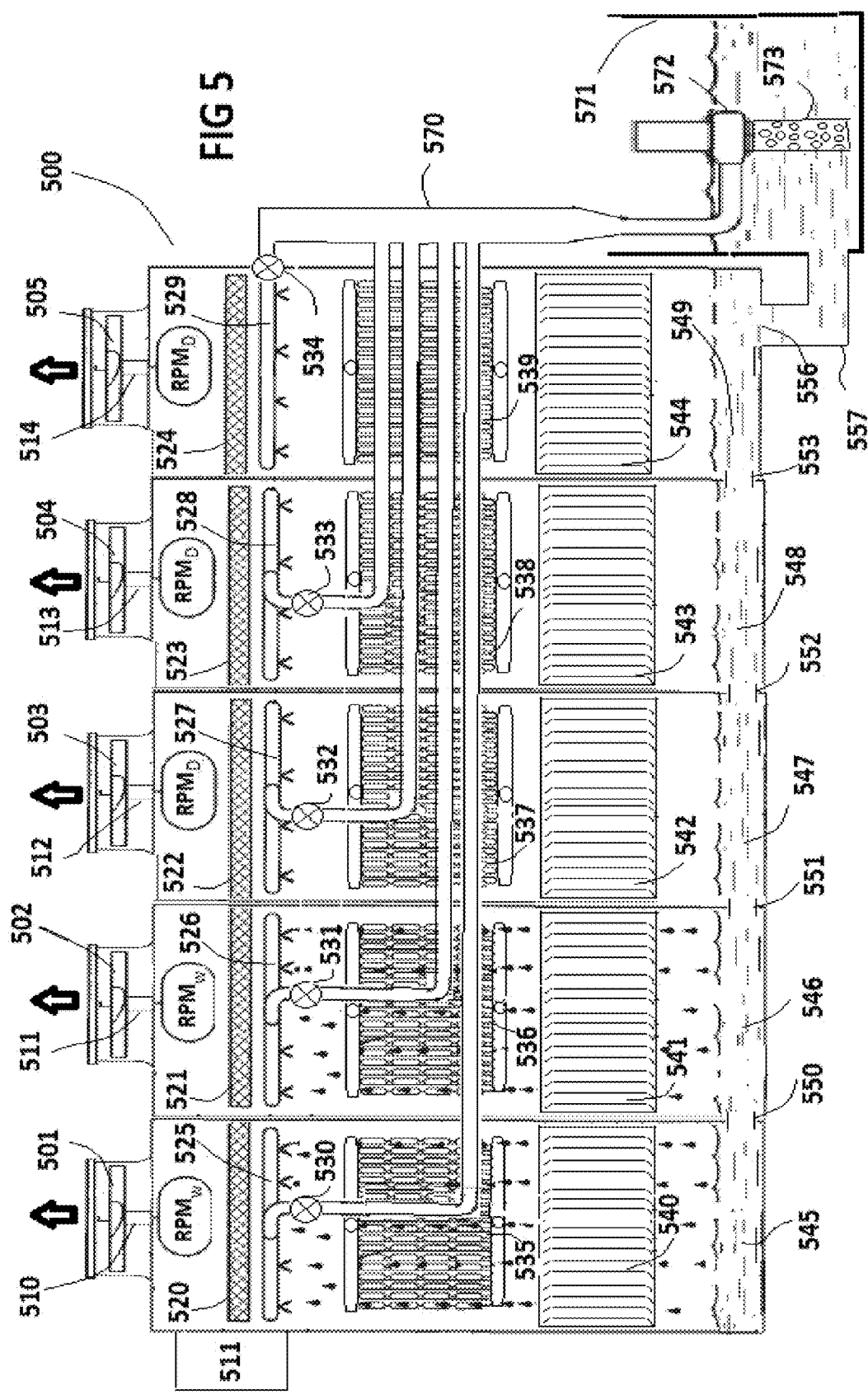
FIG. 5 shows a multi-unit heat exchanger network that utilizes a common evaporative liquid sump in accordance with examples described in this application.

FIG. 5 shows a heat exchanger network 500 that utilizes a common evaporative liquid reservoir sump 571 with five modular units bundled together.

As shown in FIG. 5, each individual unit of the network 500 operates as an independent heat exchanger having its own operating equipment. For instance, each unit has its own indirect heat exchanger or cooling region, labeled from left to right as 535, 536, 537, 538 and 539 respectively. Each unit has its own evaporative liquid zone valve 530, 531, 532, 533 and 534 which may be opened, closed or could be a modulating type. Each unit has a fan labeled from left to right as 501, 502, 503, 504 and 505 driven by its own motor 510, 511, 512, 513 and 514 respectively. Each unit has its own air inlet louvers starting from left to right 540, 541, 542, 543, and 544 respectively. Each unit has a dispenser, labeled from left to right as 525, 526, 527, 528 and 529. Each unit has an air exhaust, labeled from left to right 501, 502, 503, 504 and 505. Each unit has its drift eliminator starting from left to right 520, 521, 522, 523 and 524 respectively. Each unit is shown with an equalizer pipe 550, 551, 552, and 553 in sumps 545, 546, 547, 548 and 549 to allow the evaporative liquid to drain freely to a common evaporative liquid reservoir sump 571 through outlet 556 and through conduit 557. Pump 572 pulls common evaporative liquid through strainer 573 and pumps the evaporative liquid into common evaporative distribution conduit 570 to deliver evaporative fluid to each of zone valve 530, 531, 523, 533 and 534 respectively.

In FIG. 5, logic controller 511 (wiring not shown for clarity) has the capability to independently control the speed of fan motors (510, 511, 512, 513 and 514) which spins fans (501, 502, 503, 504 and 505), and also has the capability to control whether zone valves (530, 531, 532, 533, and 534) are open or closed depending on the processing parameters monitored and/or determined by the controller 511.

Fans (501, 502, 503, 504 and 505) discharge the exit air (501, 502, 503, 504, and 505). Individual indirect heat exchangers (535, 536, 537, 538 and 539) can operate in the wet mode as evaporative or in the dry mode as sensible heat exchangers depending on whether the zone valves (530, 531, 532, 533 and 534) are open or closed by controller 511.

In FIG. 5 indirect heat exchangers 535 and 536 are shown operating in the wet mode as only zone valves 530 and 531 are open. Fan motors 510 and 511 are also turned on and are operating at speed $RPM_W$ while indirect heat exchangers 537, 538 and 539 are operating in the dry sensible mode because spray zone valves 532, 533 and 534 are closed while fan motors 512, 513 and 514 are spinning at $RPM_D$.

In accordance with this configuration, the network 500 can operate in a variety of different arrangements. For example, in one arrangement, all the zone valves can be open, thereby operating in a fully evaporative mode. In another arrangement, all the zone valves can be closed thereby operating in a fully dry (or evaporative liquid conserving) mode. In yet another arrangement, at least one zone valve is open and at least one zone valve is closed, thereby operating the network 500 in a hybrid mode.

In one example, controller 511 can be arranged to control zone valves 530, 531, 532, 533 and 534 to be open or closed at nearly equal time periods such that each modular unit runs wet and dry for nearly equal time periods. In the example shown in FIG. 5, the network is arranged to operate in a hybrid mode that conserves evaporative liquid, because the logic controller 511 has determined that operating all the units in the dry mode is not sufficient to meet the heat exchanging demand set point. Thus to operate wet yet conserve evaporative liquid, controller 511 is arranged to reduce the amount of heat transfer from the two wet operating units by reducing airflow rate through the respective heat exchangers 535 and 536 by ramping down the speed ($RPM_W$) of motors 510 and 511 while increasing the airflow through the dry operating units 537, 538 and 539 by ramping up the speed of motors 512, 513 and 514 ($RPM_D$). This control logic can achieve a more sensible dry heat exchange from indirect heat exchangers 537, 538 and 539 relative to wet operating indirect heat exchangers 535 and 536 with nearly equal airflow rates.

Ambient air enters inlet louvers 540, 541, 542, 543 and 544 and travels generally upward through indirect heat exchangers 535, 536, 537, 538 and 539 then through drift eliminators 520, 521, 522, 523 and 524 and is propelled out of each modular unit through fans 501, 502, 503, 504 and 505 respectively. Zone valves 530, 531, 532, 533 and 534 when in the open position, allow evaporative liquid from common sump reservoir 571 to be pumped into dispenser systems 525, 526, 527, 528 and 529 and finally out of nozzles or orifices that emit the evaporative liquid into spray droplets. When desired, such as during extreme weather conditions, controller 511 may choose to turn off the fan motors and close the zone valves on entire modular units as determined by the control logic.

Figure 6:
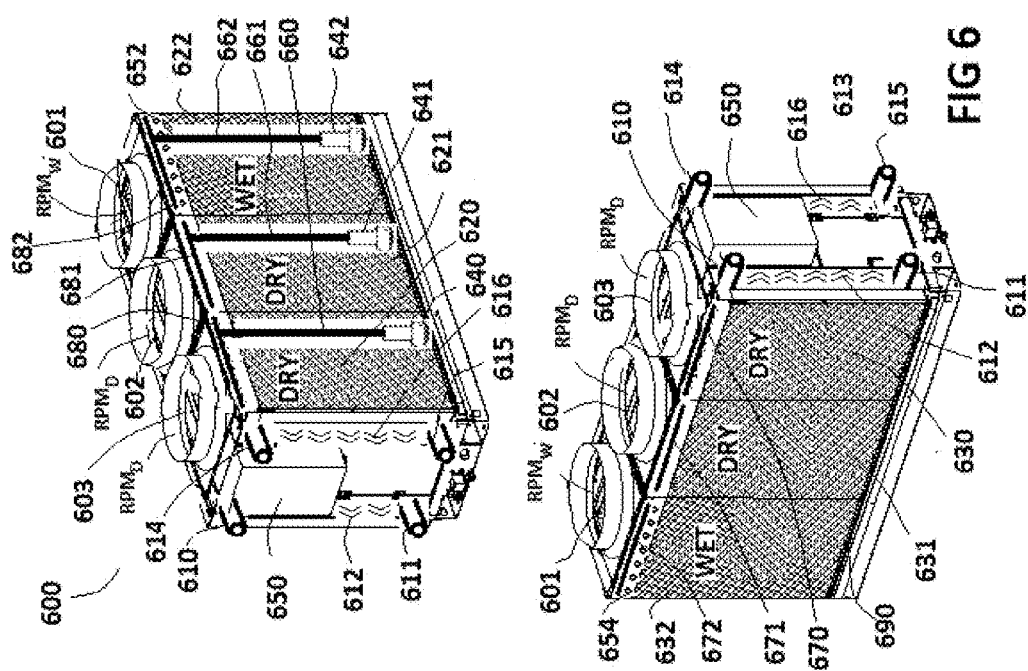
FIG. 6 shows a heat exchanger assembly that utilizes wet adiabatic saturation and that has three fans to regulate airflow in accordance with examples described in this application.

FIG. 6 shows a heat exchanger unit 600 that utilizes wet adiabatic saturation to reduce the temperature of the air entering dry operating indirect heat exchangers. Heat exchanger 600 is shown with three fans 601, 602 and 603 which induce air to flow through right side adiabatic saturator pads 620, 621 and 622 and also through left side adiabatic saturator pads 630, 631 and 632. After air travels through the saturator pads, it travels through right side indirect heat exchanger 612 and also through left side indirect heat exchanger 616 then out of fans 601, 602 and 603. Evaporative liquid, such as water, is pumped from the sump 690 through conduits 660, 661 and 662 and then to right side liquid distribution system 680, 681 and 682 which are also piped to left side liquid distribution system 670, 671 and 672 respectively where evaporative liquid 652 and 654 is delivered to the top of each adiabatic saturator pad when pumps 640, 641 and 642 are on. Other embodiments well known in the art use solenoid valves (not shown) instead of pumps to deliver liquid 652 and 654 to the top of the saturator pads. Like the other embodiments and examples presented, logic controller 650 has the capability to independently control pumps 640, 641 and 642 and also independently control the airflow in the wet and dry operating zones.

In the example shown in FIG. 6, the heat exchanger 600 is arranged to operate in a hybrid mode that conserves evaporative liquid, because logic controller 650 has determined that operating all the adiabatic saturator pads in the dry mode is not sufficient to meet the heat exchanging demands. First controller 650 turns on pump 642 which wets right saturator pad 622 and left saturator pad 632 and leaves off pumps 640 and 641 keeping saturator pads 620, 621, 630 and 631 dry.

To operate in a hybrid mode that conserves evaporative liquid, logic controller 650 is arranged to reduce the amount of heat transfer from the one wet operating zone by reducing the airflow rate through the respective portion of heat exchanger 612 and 616 by ramping down the speed ($RPM_W$) of motor 601 while increasing the airflow through the dry operating saturator pads 620, 621 and 630 and 631 by ramping up the speed of motors 602 and 603 ($RPM_D$). This allows more sensible dry heat exchange from the dry portion of indirect heat exchangers 612 and 616 relative to the wet saturated air entering the portion of heat exchangers 612 and 616 by ramping down the airflow over the wet operating fan 601. It should be noted that prior art adiabatic units wet an entire side or both sides but do not have the capability to wet only the left and right sides dedicated to one independently controlled airflow path as shown by wet saturator pads 622 and 632 in the example. Logic controller 650 also controls pumps 640, 641 and 642 to run at nearly equal time periods such that all the adiabatic pad last the same amount of time. Fluid to be cooled or condensed enters right side indirect heat exchanger 616 through inlet connection 614 and exits through exit connection 615 while fluid to be cooled or condensed in the left indirect heat exchanger 612 enters through connection 610 and exits through outlet connection 611.

Figure 7:
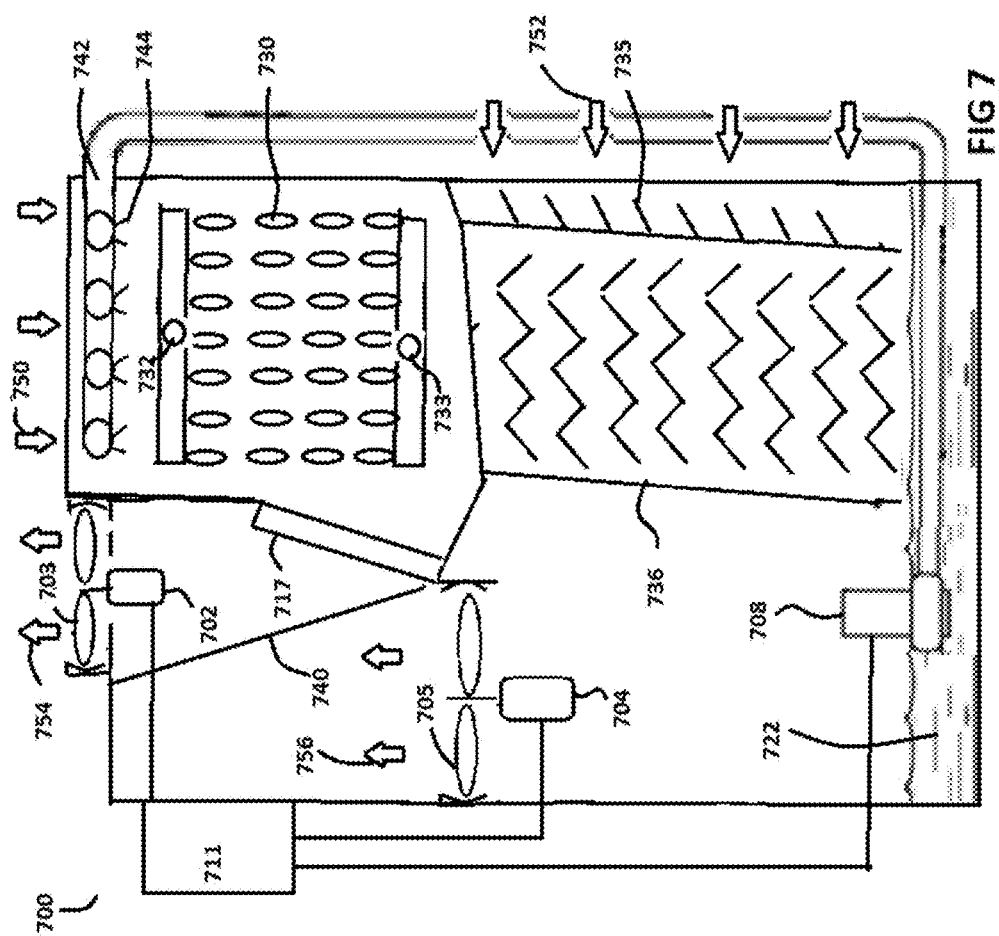
FIG. 7 shows a heat exchanger that uses a combination of indirect and direct heat exchange paths in accordance with examples described herein.

FIG. 7 shows a heat exchanger assembly 700 that uses a combination of indirect heat exchanger 730 and direct heat exchanger 736. As in the other embodiments, controller 711 can independently control the amount of airflow in each heat transfer section when running wet or dry. Fan 703 is spun by motor 702 which induces airflow to enter the indirect heat exchange section from the top air inlet 750, then through indirect heat exchanger 730 through drift eliminator 717 then out of fan 703 as discharge air 754. Fan 705 is spun by motor 704 which induces airflow to enter the direct heat exchange section 736 from the side air inlet 752 through air louvers 735, through direct heat exchange section 736 then through drift eliminator 740 then out of fan 705 as discharge air 756. Separator wall 740 prevents discharge air 756 from back flowing into indirect heat exchanger 730 and forms a reducing duct section to increase air velocity letting air discharge 756 leave at a high velocity. It should be noted that another advantage to this orientation is that the sum of the diameters of fan 703 plus fan 705 is larger than the diameter of a common fan if placed at the top of the unit which allows for more total airflow at the same KW (HP) input than prior art units.

When operating in a wet mode, controller 711 turns on pump 708, which pumps evaporative liquid from sump 722 to the top of indirect heat exchange section 730 from distribution system 742 from nozzles or orifices 744. Fluid that will ultimately be cooled or condensed enters indirect section 730 through inlet 732 and leaves via outlet 733. The flow of fluid through indirect heat exchanger 730 can be reversed when desired. Evaporative liquid then flows by gravity onto direct section 736 then back to sump 722.

In the dry mode, logic controller 711 keeps fan motor 704 off to eliminate using any KW moving air through the direct heat transfer section 736 and can ramp the speed of fan motor 702 which spins fan 703 at a much higher speed than when it was operating wet because there will be no chance of pulling drift through drift eliminators 717 when operating in the dry mode. Thus, as in the other embodiments, the dry fan speed can be set much higher than the wet fan speed when desired to conserve evaporative liquid and increase sensible heat transfer during the dry mode of operation.

Another advantage of having independent airflow streams with independently controlled airflows through the indirect and direct sections is that for most of the running time except during peak periods, fan motor 702 can be left off so that most all of the evaporation takes place in the direct section keeping the indirect section cleaner. This is true even where the heat exchanger operates in a non-hybrid mode, that is, an all-wet or all-dry mode.

The above disclosure describes general examples of particular heat exchangers with and heat exchanger networks that have multiple airflow paths, and which are capable of operating the various flow paths in a hybrid mode (e.g., with at least one path operating wet and at least one operating dry) while also operating at different airflow rates. These heat exchangers and/or networks may be shown having a particular number of exchanger cells or flow paths or units (e.g., two airflow paths or five units), but it should be understood that other configurations are possible, as long as the system includes at least two flow paths that are capable of operating independently of one another. For instance, at least one flow path is capable of operating in a wet mode while the other operates in a dry mode, and such that the airflow through each of those flow paths while operating in the hybrid mode is different from one another.

One particular example of such a heat exchanger has at least two flow paths that draw air between an air intake and an air discharge outlet. A fluid conduit passes through the heat exchanger, and the conduit has a cooling region positioned within each of the flow paths. The cooling region may include, for example, a coiled portion of the conduit.

The indirect heat exchanger includes an airflow generator that moves air through the flow paths. The airflow generator may include, for example, a fan, a blower, an air pressure devices, and/or combinations or multiples thereof. The airflow generator can be a single device that is in communication with both flow paths, or it can include multiple devices, for example, one device per flow path. In some instances, some flow paths may have more devices than other, so as to generate more airflow in the particular path.

In some heat exchangers, the individual flow paths may include various devices or systems that help control or limit airflow in the path. For example, each flow path may include one or more flow regulators within each flow path. Flow regulators can include, for example, dampers, valves, gates, louvers, or constrictors. The flow regulators can be adjustable so that they can operate in a variety of different positions. For instance, some flow regulators may be binary, such that they are either "open" allowing full airflow, or "closed" restricting airflow entirely. Other flow regulators can have additional adjustment positions between fully open and fully closed, for example, 50% open, 25% open, 95% open, etc. By adjusting the configuration of the flow regulators, the heat exchanger can control the airflow through the individual flow paths whether or not the flow path is associated with an individual airflow generator. Thus, the use of airflow regulators can be useful in heat exchangers that employ a single airflow generator, but they may also be effectively employed in other devices that utilize multiple airflow generators as well.

A controller communicates with the airflow generator and controls or regulates airflow through the first flow path and the second flow path. For example, the controller may turn the airflow generator on and off, and in some cases may adjust the speed or power of the airflow generator.

The heat exchanger also includes a dispenser positioned to dispense evaporative liquid on one of the cooling regions. The dispenser operates in a wet mode whereby the dispenser dispenses the evaporative liquid (i.e. the dispenser is "on") and a dry mode whereby the dispenser does not dispense evaporative liquid (i.e., the dispenser is "off"). While the dispenser may operate in either a fully on or fully off mode, some dispensers may be able to operate in intermediary ranges as well, whereby the flow rate of liquid dispensed in the wet mode can be adjusted.

The controller also communicates with the dispenser(s) and controls the operation thereof. For example, the controller may switch the dispenser(s) between wet and dry mode, and may even adjust the dispensing rate of evaporative fluid from the dispenser(s).

The dispenser can be arranged to have multiple dispenser units, one unit positioned in each flow path of the heat exchanger so as to dispense the evaporative liquid over each of the cooling regions. For example, the dispenser may include multiple sprayer or dispenser nozzles positioned relative to each of the cooling regions in each flow path so as to dispense at least some evaporative liquid onto the respective cooling region when the dispenser unit is operating in a wet mode. In some instances, the heat exchanger may employ separate dispensers in each flow path. In either event, the dispensers in each flow path are capable of operating independently of one another, such that one dispenser may operate in a wet mode while the other operates in the dry mode. Moreover, one dispenser may operate in a first wet mode whereby the dispense rate is higher than the other dispenser, which is also operating in a wet mode, albeit a more restrictive dispensing wet mode.

In some cases, where the heat exchanger includes two dispensers, the controller may operate the dispensers independently such that one dispenser operates in the wet mode while the other operates in a dry mode. In such a situation, the controller may also operate the various airflow generators so that the airflow through each flow path is different. For instance, the controller may regulate airflow so that the flow in the flow path operating in the dry mode is greater than that of the flow path operating in the wet mode. The controller may also be able to read or receive information from sensors or inputs, and using the received information, determine suitable operating conditions for the heat exchanger. For instance, based on the received information, the controller may determine a suitable operating mode includes operating a first flow path in a wet mode at a first airflow rate, and operating the second flow path at a dry mode at a second airflow rate higher than the first airflow rate. The flow rates can be regulated by a variety of different techniques, including adjusting the speeds of independent fans, or setting the damping or restriction settings on a flow regulation device associated with each flow path.

Figure 8:
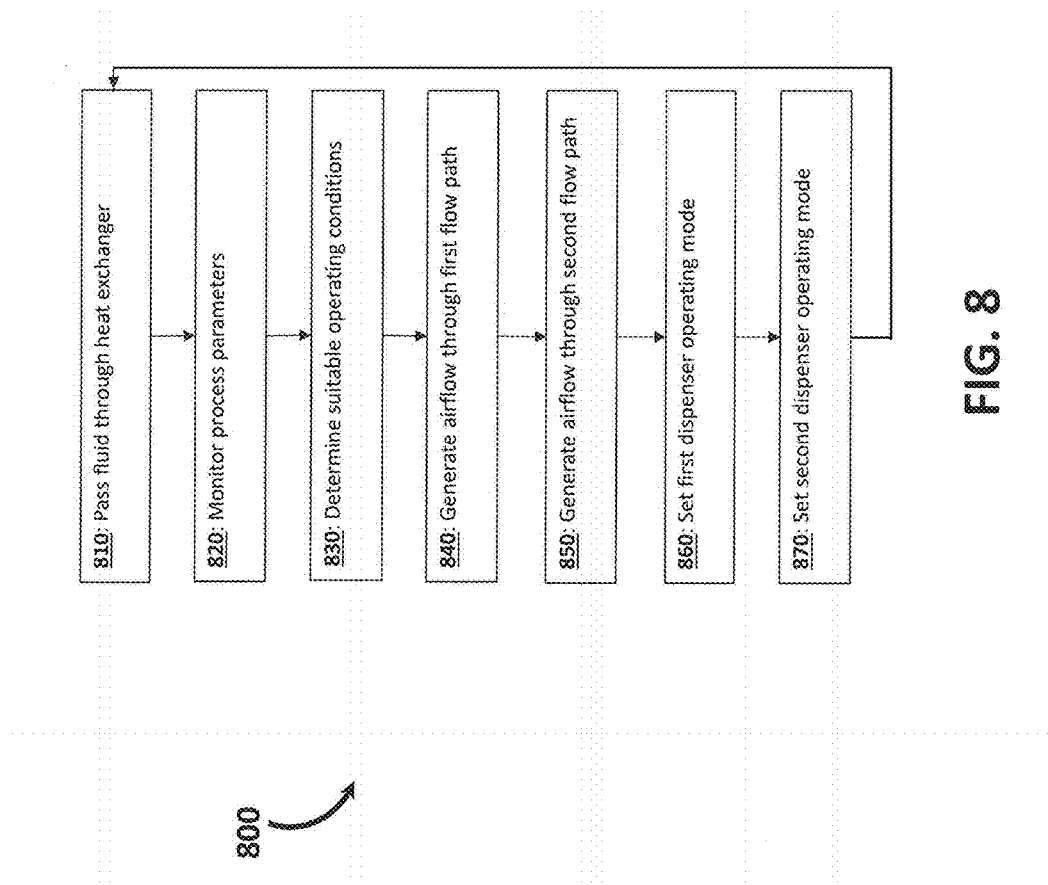
FIG. 8 is a flow diagram depicting process steps for operating a heat exchanger in accordance with examples described herein.

This application also describes methods for operating a heat exchanger and/or a heat exchanger network. FIG. 8 is a flow diagram demonstrating one example method 800 for operating a heat exchanger. Method 800 can be used to operate any of the heat exchangers or heat exchanger networks described in this application. As described with respect to the method 800 of FIG. 8, it should be understood that any time the term heat exchanger is used, the term heat exchanger network could also be substituted.

Method 800 involves passing 810 fluid through the heat exchanger via a conduit. The conduit includes an inlet and an outlet, with a cooling region in between. The cooling region can have a coil configuration, a plate configuration, or another indirect or even direct heat exchange configuration. The cooling regions are positioned within separate respective airflow paths of the heat exchanger (or within separate heat exchangers of a heat exchanger network). The cooling regions are also positioned within a dispensing zone so that dispensers of the heat exchanger can dispense or spray evaporative liquid onto the cooling regions when operating in a wet mode.

Figure 9:
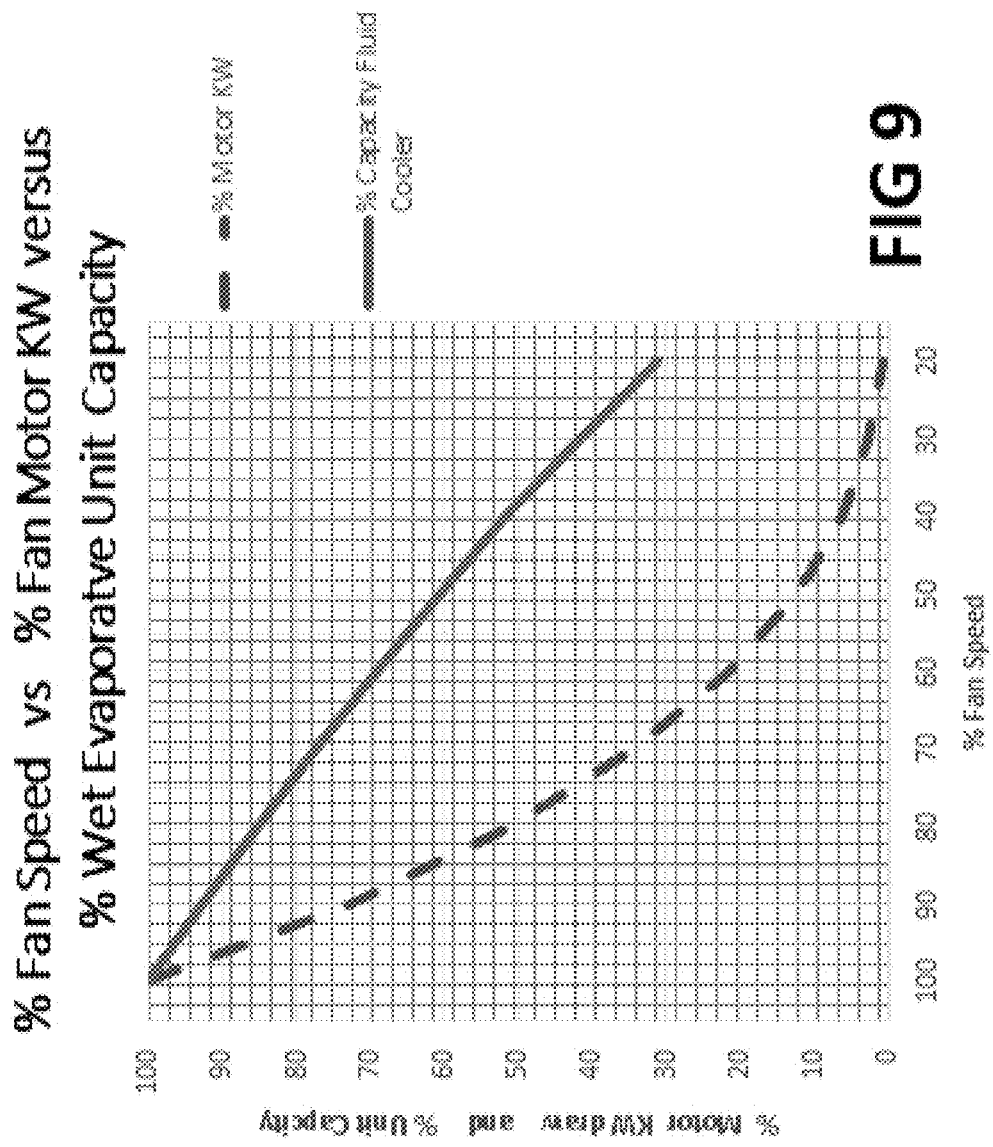
FIG. 9 shows performance data for a representative fluid cooler.

The method 800 also includes monitoring 820 process parameters. For example, the monitoring 820 can include monitoring one or more of a predetermined set point (e.g., a user inputted point), a heat exchanger performance factor as shown in FIG. 9, a water usage and cost factor, an energy usage and cost factor, and environmental conditions external to the heat exchanger. The monitoring 820 can be performed via a controller, which may receive the parameters via sensors or inputs. In some examples, the monitoring 820 can be performed remotely, and the process parameters can be delivered to a controller via a communication signal (e.g., via a wireless network).

The method 800 then determines 830 suitable operating conditions for the heat exchanger. The suitable operating conditions can be determined 830 via the controller, for example, and can include operating airflow rates for each of the various flow paths of the heat exchanger. The suitable operating conditions can also include suitable dispensing modes of the flow paths. For instance, based on the monitored process parameters, the method 800 may determine 830 that the first flow path should operate in a wet mode and have a first airflow rate, and that the second flow path should operate in a dry mode and have a second airflow rate different from the first. In such a hybrid mode of operation (i.e., where one flow path operates wet and the other operates as dry), the airflow rate through the dry flow path may be greater than that through the first airflow path.

The method then generates airflow through the first flow path 840 at the first operating airflow rate, and generates airflow through the second flow path 850 at the second determined airflow rate. In some instances, generating 840/850 the airflow can involve setting the motor of individual fans associated with each of the individual flow paths to different levels. In other examples, generating 840/850 the airflow may involve maintaining a constant fan speed but adjusting various flow regulators in the flow paths to different levels. For instance, generating the airflow in the first flow path 840 may involve setting a damper positioned in the first airflow path to a first setting associated with the desired airflow and generating the airflow in the second flow path 850 may involve setting a damper positioned in the second flow path to a second setting associated with the desired airflow.

The method 800 further involves operating the first dispenser at the first operating dispensing mode 860 and operating the second dispenser at the second operating dispensing mode 870. For example, the first dispenser may operate in a wet mode whereby it dispenses evaporative liquid onto the cooling region, and the second dispenser may operate in a dry mode where it does not dispense evaporative liquid.

In this way, the method 800 can be used to operate a heat exchanger in a variety of different operating modes, including an all wet mode, where all flow paths are operating with the dispenser on, an all dry mode where all flow paths are operating with the dispenser off, and a hybrid mode, where at least one dispenser is on and at least one is off. The method 800 can also be used to efficiently and effectively utilize the hybrid mode such that savings in water (or any evaporative liquid) and/or energy can be obtained by way of the flow path operating in a dry mode with a different flow rate there through.

An example of heat exchanger performance factor used by the logic controllers is shown in FIG. 9. If selected, the control logic internal to the logic controller can strive to minimize overall operating costs by looking at the inputted cost of water and energy and looks at the embedded fan speed and fan motor KW consumed versus unit capacity as shown in FIG. 9 and strives to reduce the overall water and energy costs.

FIG. 9 shows performance data for a representative fluid cooler. As an example, when fan speed runs at 80% of full speed in the wet evaporative mode, the fan motor draws about 50% of full speed KW yet the unit capacity is about 85% of full capacity. When fan speed runs at 40% of full speed, the fan motor will only draw about 10% of full speed KW power yet unit capacity is about 50% of full capacity. Armed with fan speed versus fan motor KW consumption relative to the particular unit capacity at each speed, the control logic can decide how to cycle on and off the wet and dry sections as well as independently control fan speeds through the wet and dry sections to minimize total operating costs. For example, during a peak time when energy costs are far more expensive than off peak times, the control logic calculates operating costs and shifts to use of more wet evaporative operation than during off peak times. In this way, more evaporative liquid is typically used during peak times to reduce costly energy demand rates while less water can be utilized when the cost of energy becomes much cheaper.

The control logic calculates the increase in unit capacity relative to increasing fan KW and will cycle on more wet cells when more fan speed/KW is not beneficial. In another example, when the customer desires to save water as much as possible, either because water is very expensive or simple not abundantly available, the control logic will leave off as many wet operating heat exchangers as possible and ramp up the fan speed on the dry operating heat exchangers. The ability to ramp up the dry operating fan speed while dialing back on the number of operating wet heat exchangers and ramping down the wet fan speeds is one of the main improvements over prior art. The control logic is programmed to know that it also makes sense to not exceed a maximum fan speed which can be regulated to save energy. For instance, to save the maximum amount of water, the logic can ramp the dry fan speed(s) up to 100%. However, the control logic is programmed to know that there is a law of diminishing returns with ramping up the dry fan speed and a sizeable water savings is still possible at a maximum allowed fan speed of say 70% for example. This logic would save a substantial amount of energy savings rather than run to run the dry speed fan(s) to 100% for the last few percent of potential water savings.

This application describes preferred embodiments and examples of operating heat exchangers, and should thus be interpreted to be illustrative and not limiting. Those skilled in the art will recognize that the described examples could be modified and/or combined with one another without departing from the scope described herein. Further, features of one embodiment or example may be combined with features of other embodiments or examples to provide still further embodiments or examples as desired. All references that this application cites, discusses, identifies, or refers to are hereby incorporated by reference in their entirety.

The invention claimed is:

1. A heat exchanger comprising:
   a first flow path positioned between an air intake and an air discharge outlet of the heat exchanger;
   a second flow path between an air intake and an air discharge outlet of the heat exchanger;
   a fluid conduit comprising:
      a first cooling region positioned within the first flow path; and
      a second cooling region positioned within the second flow path;
   an airflow generator configured to move air through the first and second flow paths;
   at least one dispenser configured to operate in a wet mode whereby the dispenser dispenses evaporative liquid and a dry mode whereby the dispenser does not dispense evaporative fluid, the at least one dispenser positioned to dispense evaporative liquid over at least one of the first and second cooling regions; and
   a controller in communication with the airflow generator and the dispenser,
   wherein the controller is configured to regulate airflow through the first flow path and the second flow path,
   wherein the controller is configured to set the dispensing mode of the at least one dispenser,
   wherein the at least one dispenser comprises a first dispenser positioned within the first airflow path to dispense evaporative fluid on the first cooling region and a second dispenser positioned within the second airflow path to dispense evaporative fluid on the second fluid region,
wherein each of the first and second dispensers are configured to operate in a wet mode whereby the dispenser dispenses evaporative liquid and a dry mode whereby the dispenser does not dispense evaporative fluid,
wherein the controller is configured to set the dispense mode of the first and the second dispensers so that the dispense mode of the first dispenser is independent of the dispense mode of the second dispenser, and
wherein the controller is configured to monitor process parameters, the process parameters including at least one of a predetermined set point, a heat exchanger performance factor, a water cost and usage factor, an energy cost and usage factor, and environmental conditions external to the heat exchanger.

2. The heat exchanger of claim 1, wherein the airflow generator comprises a first fan in communication with the first flow path and a second fan in communication with a second flow path, wherein the controller regulates a fan speed for each of the first and second fans, wherein the fan speed of the first fan is independent of that of the second fan.

3. The heat exchanger of claim 1, further comprising a flow regulator in communication with the controller and positioned within at least one of the first and second flow paths, the flow regulator configured to regulate the flow of air that passes through the respective flow path.

4. The heat exchanger of claim 3, wherein the flow regulator includes a first damper positioned within the first flow path, the first damper configured to be set to a fully open position, a fully closed position, or to a plurality of intermediary positions between the fully open and fully closed position, wherein the controller is configured to set the position of the first damper.

5. The heat exchanger of claim 4, wherein the flow regulator includes a second damper positioned within the second flow path, the second damper configured to be set to a fully open position, a fully closed position, or to a plurality of intermediary positions between the fully open and fully closed position, wherein the controller is configured to set the position of the second damper.

6. The heat exchanger of claim 5, wherein the airflow generator consists of a single fan in communication with both the first and second flow paths.

7. The heat exchanger of claim 3, further comprising a first air intake through which air is drawn into the first flow path and a second air intake through which air is drawn into the second flow path, wherein the flow regulator includes at least one modulating damper positioned at the first air inlet.

8. The heat exchanger of claim 1, wherein the controller is configured to operate one of the first or second dispenser in the wet mode while simultaneously operating the other dispenser in the dry mode.

9. The heat exchanger of claim 8, wherein the controller is configured to generate a first airflow rate through the first flow path and to generate a second airflow rate through the second flow path, wherein the first airflow rate differs from the second airflow rate.

10. The heat exchanger of claim 1, wherein the controller is configured to determine suitable airflow rates through the first and second flow paths and suitable dispensing modes for the first and second dispensers based, at least in part, on the monitored process parameters,
wherein the controller is configured to adjust the flow rate through each of the first and second flow paths to correspond with the corresponding suitable airflow rates determined by the controller for each flow path, and
wherein the controller is configured to set the dispensing mode for the first and second dispensers to the suitable dispensing mode determined by the controller.

11. The heat exchanger of claim 1, wherein the heat exchanger is an indirect heat exchanger, and the first and second cooling regions comprise at least one of a coiled configuration or a plate configuration.

12. A method of operating a heat exchanger, the method comprising:
passing fluid through the heat exchanger via a conduit, the conduit comprising a cooling region positioned within a first airflow path of the indirect heat exchanger and a second cooling region positioned within a second airflow path of the heat exchanger, the first cooling region located in a dispensing zone of a first dispenser and the second cooling region located within a dispensing zone of a second dispenser;
monitoring process parameters with a controller, the process parameters including at least one of a predetermined set point, a heat exchanger performance factor, a water usage factor, an energy usage factor, and environmental conditions external to the heat exchanger;
determining, with the controller, a first operating airflow rate, a second operating airflow rate, a first operating dispensing mode, and a second operating dispensing mode based, at least in part, on the monitored process parameters;
generating airflow through the first airflow path at the first operating airflow rate;
generating airflow through the second airflow path at the second operating airflow rate;
operating the first dispenser at the first operating dispensing mode; and
operating the second dispenser at the second operating dispensing mode,
wherein the first and second operating dispensing mode correspond with at least one of a wet mode and a dry mode, whereby the dispensers dispense at least some evaporative liquid on a cooling region when operating in a wet mode, and whereby the dispensers do not dispense evaporative liquid when operating in the dry mode.

13. The method of claim 12, wherein the first dispensing mode corresponds with a wet mode and the second dispensing mode corresponds with a dry mode.

14. The method of claim 13, wherein the first airflow rate differs from the second airflow rate.

15. The method of claim 12, wherein generating airflow through the first flow path involves operating a first fan in communication with the first flow path,
wherein generating airflow through the second airflow path involves operating a second fan in communication with the second flow path,
wherein determining the first operating airflow rate involves selecting a fan speed for the first fan, and
wherein determining the second operating airflow rate involves selecting a fan speed for the second fan.

16. The method of claim 15, wherein the fan speed of the first fan differs from the fan speed of the second fan.

17. The method of claim 12, wherein the controller is in communication with a first airflow regulator positioned in the first airflow path and a second airflow regulator positioned in the second airflow path, wherein determining the first operating airflow rate involves selecting a first setting for the first airflow regulator, wherein determining the second operating airflow rate involves selecting a second setting for the second airflow regulator, wherein generating airflow through the first flow path involves operating the first airflow regulator at the first setting, and wherein generating airflow through the second airflow path involves operating the second airflow regulator at the second setting.

18. The method of claim 17, wherein generating airflow through the first and second flow paths involves operating a single fan positioned in communication with both the first and second airflow paths.

19. The method of claim 12, wherein determining the first operating dispensing mode involves determining a first dispenser valve setting, wherein determining the second operating dispensing mode involves determining a second dispenser valve setting, wherein operating the first dispenser at the first operating dispensing mode involves operating the first dispenser at the first dispenser valve setting, and wherein operating the second dispenser at the second operating dispensing mode involves operating the second dispenser at the second dispenser valve setting.

20. A heat exchanger network comprising:
a plurality of heat exchangers, each heat exchanger comprising:
  an airflow path between a heat exchanger intake and a heat exchanger discharge outlet;
  an airflow generator configured to move air through the airflow path;
  a fluid conduit including a cooling region positioned within the airflow path; and
  a dispenser positioned within the airflow path to dispense evaporative fluid on the cooling region, the dispenser configured to operate in a wet mode whereby the dispenser dispenses evaporative liquid over the cooling region and in a dry mode whereby the dispenser does not dispense evaporative fluid; and
a controller in communication with each of the plurality of heat exchangers, the controller configured to regulate airflow through the flow paths of and to control operation of the dispenser of the heat exchangers, wherein the controller is configured to monitor process parameters, the process parameters including at least one of a predetermined set point, a heat exchanger performance factor, a water cost and usage factor, an energy cost and usage factor, and environmental conditions external to the heat exchanger, wherein the controller is configured to determine a suitable airflow rate and a suitable evaporative liquid dispensing mode for each of the plurality of heat exchangers based at least in part on the monitored process parameters, wherein the controller is configured to set the airflow rates through the flow path of an individual heat exchanger among the plurality of heat exchangers to the corresponding determined suitable airflow rate for that heat exchanger, and wherein the controller is configured to set the dispensing mode of the dispenser of an individual indirect heat exchanger among the plurality of heat exchangers to the corresponding determined suitable evaporative liquid dispensing mode for that heat exchanger, and wherein the controller is configured to operate one or more of the dispensers of the individual heat exchangers in a wet mode while simultaneously operating at least one of the individual dispensers in a dry mode.

21. The heat exchanger network of claim 20, wherein the controller is configured to set the airflow through an airflow path having a dispenser operating in a wet mode at a first airflow rate while simultaneously setting the airflow through an airflow path having a dispenser operating in a dry mode at a second airflow rate.

22. The heat exchanger network of claim 21, wherein the second airflow rate is greater than the first airflow rate.

23. The heat exchanger network of claim 21, wherein the controller is configured to set the same airflow rate through all the airflow paths having a dispenser operating in a wet mode and configured to set the same airflow rate through all the airflow paths having a dispenser operating in a dry mode.

24. The heat exchanger network of claim 21, wherein the controller is configured to start with single module and adds modules as needed and once all the modules are operating, the controller synchronizes the fan speed to maximize energy savings.

* * * * *